(12) United States Patent
Altman et al.

(10) Patent No.: US 7,570,351 B2
(45) Date of Patent: Aug. 4, 2009

(54) METHOD AND SYSTEM FOR MEASURING THE CURVATURE OF AN OPTICAL SURFACE

(75) Inventors: Zino Altman, Newtown, PA (US); Daniel R. Neal, Tijeras, NM (US); Richard James Copland, Albuquerque, NM (US)

(73) Assignee: Amo Wavefront Sciences, LLC., Santa Ana, CA (US)

( * ) Notice: Subject to any disclaimer, the term of this patent is extended or adjusted under 35 U.S.C. 154(b) by 384 days.

(21) Appl. No.: 11/478,433

(22) Filed: Jun. 30, 2006

(65) Prior Publication Data

US 2007/0002334 A1    Jan. 4, 2007

Related U.S. Application Data

(60) Provisional application No. 60/694,989, filed on Jun. 30, 2005.

(51) Int. Cl.
*G01B 9/00* (2006.01)
(52) U.S. Cl. .................................................. 356/124
(58) Field of Classification Search .................. None
See application file for complete search history.

(56) References Cited

U.S. PATENT DOCUMENTS 5,873,832 A * 2/1999 Maloney et al. ............ 600/473

* cited by examiner

*Primary Examiner*—Gregory J Toatley, Jr.
*Assistant Examiner*—Amanda H Merlino
(74) *Attorney, Agent, or Firm*—Abbott Medical Optics Inc.

(57) ABSTRACT

A system and method of measuring the curvature of a surface of a object operate by illuminating the object surface with a light pattern having a known size to produce a virtual reflected image from the object surface; measuring a size of the virtual reflected image produced by the object surface from the light pattern; and calculating a curvature of the object surface from the known size of the light pattern and the size of the virtual reflected image.

13 Claims, 3 Drawing Sheets

METHOD AND SYSTEM FOR MEASURING THE CURVATURE OF AN OPTICAL SURFACE

CROSS-REFERENCES TO RELATED APPLICATIONS

This patent application claims the priority benefit under 35 U.S.C. § 119 (e) from U.S. provisional patent application 60/694,989 filed on 30 Jun. 2005 in the name of Zino Altman, the entire disclosure of which is hereby incorporated herein by reference in its entirety as if fully set forth herein.

BACKGROUND AND SUMMARY

1. Field

This invention pertains to the field of optical measurements, and more particularly, to a system and method of measuring the curvature of an optical surface.

2. Description

While the prior art contains many theoretical and practical methods of identification of the optical power of a lens, most of them evaluate the lens' ability to bend light, and rely on the resolution of the receiving device. One of the most common methods used in lens meters uses image dimensional changes to estimate lens magnification and thus derive its optical power in diopters. Other methods rely on mechanical gages (Swiss gage) and profile-meters to actually define geometrical curvature of the lens surface and compute its power.

While every method of the identifying a lens has its merit, some of the methods used today have one or more of the following disadvantages: they take a long time; they exhibit a high sensitivity to the lens' location, positioning, material properties, and coating; and they cannot be easily automated.

Limitations to the uniformity of the refractive index of the material, and the lens thickness in combination with possible coating variations, can present significant challenges to the data fidelity of any direct imaging method of characterizing a lens. Here, a direct imaging method can be defined as one where the image produced by the lens under test is analyzed to determine the lens power.

Meanwhile, currently there is a trend toward the high scale production of semi-finished coated lenses in the spectacle lenses industry. With some lenses, the manufacturer only controls the curvature of one surface of the lens, and the lens is finished by a retailer to meet a particular customer's requirement. These lenses ate produced from variety of the materials (mostly plastics) with an even wider variety of coatings.

Therefore, since the curvature of only one surface of the product needs to be controlled and measured, there is a need for the new method and system for measuring the curvature of the lens surface.

Accordingly, it would be advantageous to provide an improved system and method of measuring the curvature of a lens surface. It would also be advantageous to provide such a system and method which do not depend upon there being any control on the curvature of the opposite surface of the lens. Other and further objects and advantages will appear hereinafter.

The present invention comprises a system and method of measuring the curvature of an optical surface of an object, such as a lens.

In one aspect of the invention, a method of measuring the curvature of a surface of an object comprises: illuminating the object surface with a light pattern having a known size to produce a virtual reflected image from the optical surface; measuring a size of the virtual reflected image produced by the optical surface from the light pattern; and calculating a curvature of the optical surface from the known size of the light pattern and the size of the virtual reflected image. Beneficially, the method includes suppressing by electronic or optical means all second and higher order reflections ("ghost images") produced by the object from affecting the measurement of the size of the virtual reflected image.

In another aspect of the invention, a system for measuring the curvature of a surface of an object comprises: an image generator adapted to illuminate the object surface with a light pattern having a known size to produce a virtual reflected image from the object surface; an image detector for detecting the virtual reflected image from the object surface; and a controller adapted to calculate a curvature of the object surface from the known size of the light pattern and a size of the virtual reflected image detected by the image detector. Beneficially, the image generator includes a light source producing ultraviolet light or other light having a wavelength or wavelengths suitable for the object material, such as wavelengths which are absorbed by the object material yet can still trigger a detection device for detecting the virtual reflected image.

DETAILED DESCRIPTION

Figure 1:
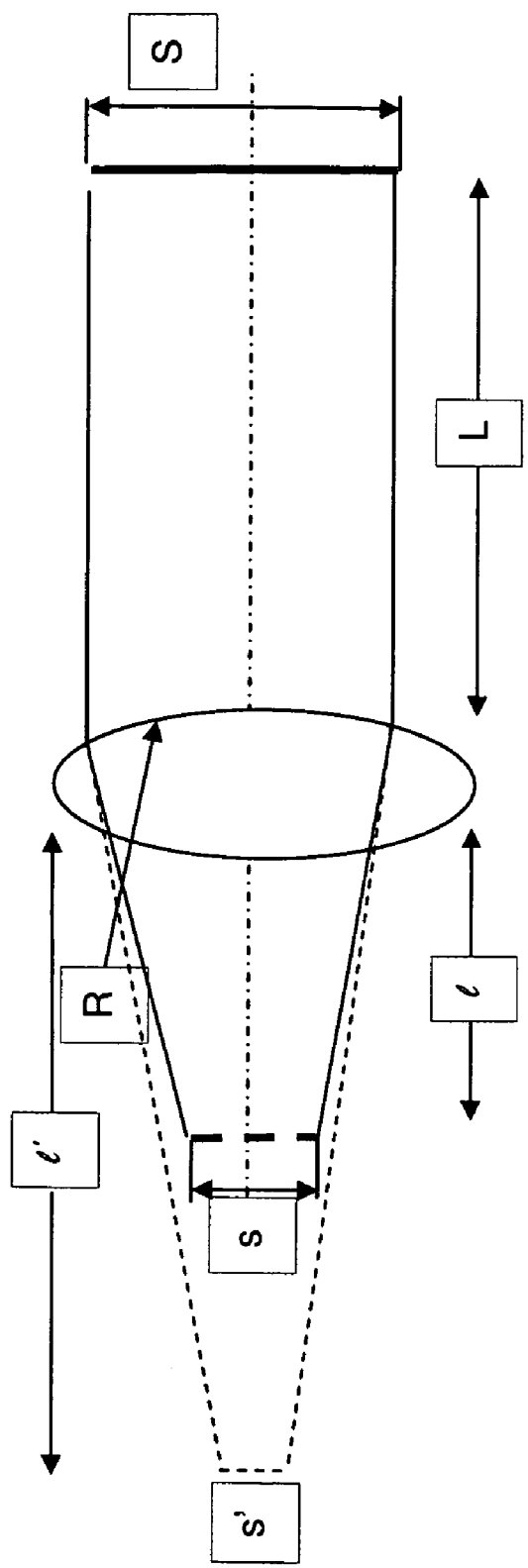
FIG. 1 is a schematic drawing illustrating the relationship between an object, a real image, and a virtual reflected image from a lens surface.

FIG. 1 is a schematic drawing illustrating the relationship between an object S, a real image s, and a virtual reflected image s' reflected by a surface 105 of a lens 100.

Whereas a regular flat mirror reflects an image with little or no distortion, lens surface 105 reflects the real image s distorted (magnified or reduced in size) proportional to the curvature and shape of lens surface 105. This virtual reflected image s' can be observed as being located behind the surface 105 of lens 100 at a distance l' proportional to the distance l of the real image s from the lens surface 105, as shown on the FIG. 1.

In FIG. 1, R is the radius of curvature of lens surface 105. It is well known that if R=∞, then S/s=1. As R becomes less than ∞, then the ratio of S/s becomes greater than 1 and represents magnification (distortion) of the object S. With a known distance L from the actual object plane S to the lens surface 105, we can compute lens curvature R of the lens surface 105 as follows.

If the lens magnification is defined as m=S/s, and we know the distances L and l then:

$$m = S/s = L/l. \tag{1}$$

Meanwhile, the main lens formula is:

$$f = 1/L + 1/l_{[MSOffice1]}. \tag{2}$$

From equations (1) and (2), we derive:

$$f = S*m/(m+1_{[MSOffice2]}) \tag{3}$$

For the distance of L=200 mm and magnification level 4 we find that f=160 mm.

This is a true solution for the formula, known as the Lens Maker formula:

$$1/f=(n-1)(1/r_1-1/r_2). \qquad (4)$$

For a plano-convex lens, one of the radii equals ∞, and so the corresponding 1/r term vanishes from the equation (4). In that case, assuming a lens material having a refractive index of 1.41, then:

$$r=0.41f=65.6 \text{ mm}. \qquad (5)$$

The same logic and analysis is employed for the virtual reflected image s' where the front surface 105 of lens 100 can be treated as a physical single surface lens, and where s' replaces real image s. The same reasoning can also be applied to analyze the virtual reflected image from the back surface 110 of lens 100.

From the analysis above, it is discovered that if we let the object S become a two-dimensional object, we can define either lens axial positioning error or its surface irregularity, if suspected. Any two-dimensional object S with known parameters can be used as initial data point for the lens ID point.

For example, if we make the object an equilateral triangle where S is the dimension of the length of one side of the triangle, then the virtual reflected image should also be an equilateral triangle with side length s'.

If we measure all threes side of the reflected virtual image and compare them to each other then we can derive a quality factor for the lens. If the system set-up is close to the ideal in terms of perpendicularity and straightness, then the quality factor should be close to 1. By allowing the quality factor to vary from "1" we can set system tolerances for the lens positioning and optical alignment. This may also used to auto verify system alignment.

Figure 2:
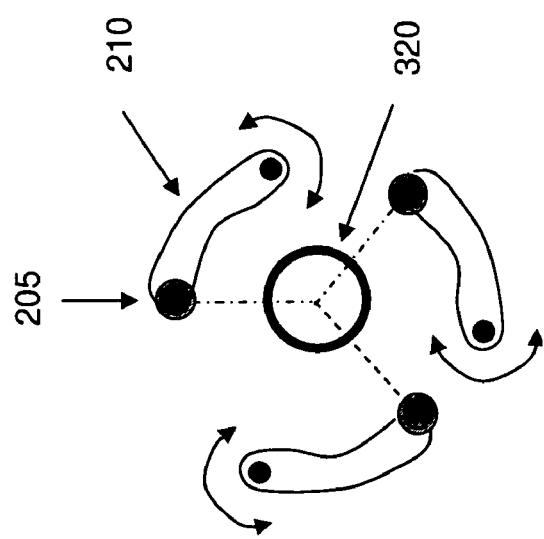
FIG. 2 is an axial view of one embodiment of an image generator and detector.

FIG. 2 shows one embodiment of an illuminating means 200 for illuminating a surface of a lens as described above for measuring the curvature of the lens surface from a virtual reflected image. Illuminating means 200 includes light sources 205 or image points on a motion stage 210 which allows for their location to be changed, as shown in FIG. 2. The ability to provide an adjustable image size (in FIG. 2, the ability to manipulate the distance "S" between light sources) allows for a fast and direct system development for the quick identification of the optical surfaces. Beneficially, light sources 105 produce ultraviolet light or other light having a wavelength or wavelengths suitable for a target lens material, such as wavelengths which are absorbed by the lens material yet can still trigger a detection device for detecting the virtual reflected image.

In one embodiment, systems and methods as described herein may be employed by a lens manufacturer to characterize the radius of curvature and/or other characteristics of a lens surface in a production facility. In that case, typically acceptance criteria are established for determining whether a lens is acceptable and may be shipped to a customer, or is rejected. Knowing the acceptance criteria for the surface curvature allows one to preset the distance "S" between light sources to such a value that the size and/or area of the equilateral triangle formed by the virtual reflected images s' of light sources 105, when detected by a charge coupled device (CCD) camera or other detection device, have certain expected values in terms of the number of pixels or other units that are "occupied" in the detection device. Therefore, when the size and/or area of a virtual reflected image from a particular sample lens varies from the accepted values in terms of the number of pixels or other units that are "occupied" in the detection device, it can be determined whether the sample lens is acceptable ("passes") or is rejected ("fails").

Figure 3:
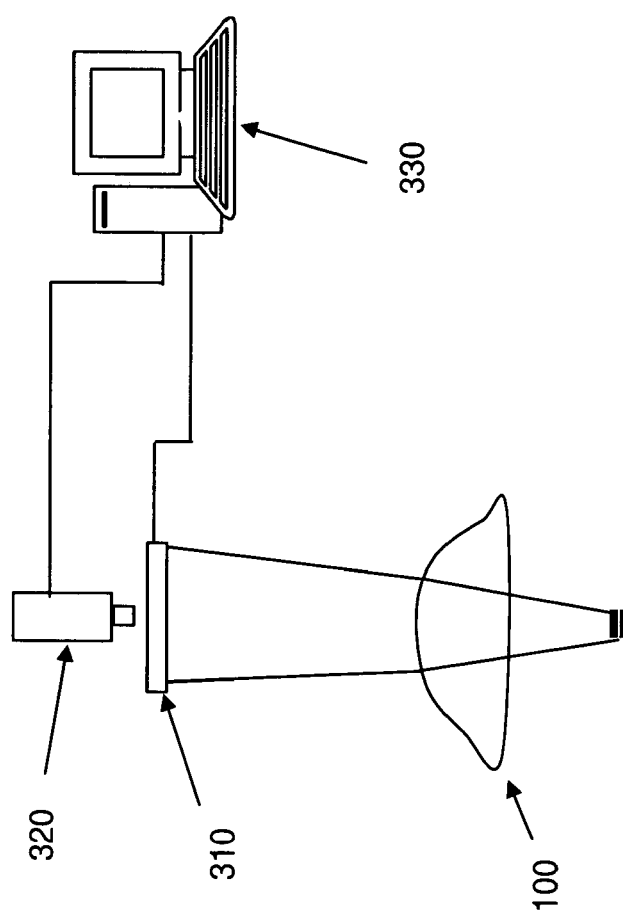
FIG. 3 is a block diagram illustrating a system and method of measuring the curvature of an optical surface.

FIG. 3 is a block diagram illustrating one embodiment of a system 300 for measuring the curvature of an optical surface, such as a surface of a lens 100. System 300 includes an image generator 310, an image detector 320, and a controller 330.

Image generator 310 may include light sources or image points on a motion stage which allows for their location to be changed, for example as illustrated in FIG. 2. Beneficially, the light sources produce ultraviolet light or other light having a wavelength or wavelengths suitable for the material of lens 100, such as wavelengths which are absorbed by the lens 100 yet can still trigger a detection by image detector 320.

Image detector 320 may be a charge coupled-device (CCD) detector. Controller 330 may include a microprocessor and memory, including program memory adapted to store machine (processor) executable code for controlling image generator 310 and image detector 320 to carry out algorithms as described above and below.

Operationally, as explained above image generator 310 is located a known distance away from lens 100. Image generator 310 is controlled controller 330 to generate an object S of a known size, using the light sources and to direct light rays from S to lens 100. As described above, from object S, lens 105 produces a virtual reflected image s' whose size is measured by image detector 320. Then, using equations such as those provided above, controller 330 is able to determine characteristics about the surface 105 of lens 100, such as the curvature. Beneficially, controller 330 may control image generator 310 to adjust the position of the light sources (e.g., through a moving stage) and thereby change the size of the object S. Measurements of the size of virtual reflected image s' may be repeated for a number of different-sized objects S to improve the accuracy of the lens surface measurements, or to derive additional parameters described the surface 105.

Beneficially, the system 300 and method desc4ribed above include means for suppressing all second and higher order reflections ("ghost images") produced by lens 100. Such suppression may be accomplished by electronic or optical means. Optical means may include optical filters, polarizers, specific coatings placed on lens 100, etc. Electronic means can comprise providing specific criteria for image detection and recognition that will exclude or suppress second and higher order reflections that typically will have a reduced amplitude. Such criteria may include a boundary on the size of the detected image, an intensity threshold for the detected image, a boundary on the location of received light relative to a region of interest, etc. For example, image detector 320 may be controlled such that its detection threshold is set at a level where its minimum sensitivity is higher than the maximum expected intensity of any ghost reflections.

Embodiments of the arrangements discussed and described above and shown in the attached drawings may include one or more of the following features: (1) Several elementary light sources are used to produce a reflection image in the optical surface of some curvature, where electronic decoding of the image distortion is used to define surface curvature; (2) the light sources are of the specific wavelength corresponding to the material of the substrate being analyzed; (3) a single surface of a substrate is analyzed at a time; (4) both substrate surfaces are analyzed at the same time; (5) the substrate is a semi-finished spectacle lens; (6) the substrate is finished spectacle lens; (7) controller 330 derives actual lens power in diopters (D); (8) controller 330 measures the surface curvature in mm; (9) more than one point of measurements is taken on the single surface, so that multifocal and progressive focal length lenses can be identified;

and (10) more than one point of measurements is taken on both surfaces, so that multi-focal and progressive focal length lenses can be identified.

While preferred embodiments are disclosed herein, many variations are possible which remain within the concept and scope of the invention. For example, although the embodiments described above have exception utility for measuring the curvature of a lens, it should be understood that they can be more generally applied to characterize an appropriate optical surface of an object. Such variations would become clear to one of ordinary skill in the art after inspection of the specification, drawings and claims herein. The invention therefore is not to be restricted except within the spirit and scope of the appended claims.

We claim:

1. A method of measuring the curvature of a surface of an object, comprising:
    (a) illuminating the object surface with a light pattern having a known size to produce a virtual reflected image from the optical surface;
    (b) measuring a size of the virtual reflected image produced by the optical surface from the light pattern;
    (c) calculating a curvature of the optical surface from the known size of the light pattern and the size of the virtual reflected image; and
    (d) adjusting the size of the light pattern; and
    (e) repeating steps (b) and (c) for the light pattern having the adjusted size.

2. The method of claim 1, further including suppressing any second or higher order reflections from the object surface from affecting the measurement of the size of the virtual reflected image.

3. The method of claim 1, wherein measuring a size of the virtual reflected image produced by the object surface from the light pattern comprises:
    detecting the virtual reflected image with a charge coupled device (CCD) having a plurality of pixels; and
    measuring the size from the pixels of the CCD that are illuminated by the virtual reflected image.

4. The method of claim 3, further comprising ignoring any pixels illuminated by light having an intensity below a set threshold when measuring the size of the virtual reflected image.

5. The method of claim 1, wherein the light pattern produces light which is absorbed by a material of the object.

6. A system for measuring the curvature of a surface of a object, comprising:
    an image generator adapted to illuminate the object surface with a light pattern having a known size to produce a virtual reflected image from the object surface;
    an image detector for detecting the virtual reflected image from the object surface; and
    a controller adapted to calculate a curvature of the object surface from the known size of the light pattern and a size of the virtual reflected image detected by the image detector wherein the controller adjusts the size of the light pattern and the measurement of the curvature of the object is repeated for the light pattern having the adjusted size;
    further comprising suppression means for suppressing all second and higher order reflections produced by the object from affecting the measurement of the size of the virtual reflected image.

7. The system of claim 6, wherein the image detector is a charged-coupled device (CCD).

8. The system of claim 6, wherein the suppression means includes specific criteria for image detection by the image detector which excludes at least some light from the second and higher order reflections from being detected.

9. The system of claim 6, further comprising optical means for excluding at least some light from the second and higher order reflections from reaching the image detector.

10. The system of claim 6, wherein the controller is further adapted to control one or more parameters of the image generator.

11. A system for measuring the curvature of a surface of a object, comprising:
    an image generator adapted to illuminate the object surface with a light pattern having a known size to produce a virtual reflected image from the object surface;
    an image detector for detecting the virtual reflected image from the object surface; and
    a controller adapted to calculate a curvature of the object surface from the known size of the light pattern and a size of the virtual reflected image detected by the image detector wherein the controller adjusts the size of the light pattern and the measurement of the curvature of the object is repeated for the light pattern having the adjusted size;
    wherein the image generator comprises a motion stage and a plurality of light sources affixed to the motion stage;
    wherein the plurality of light sources each produce ultraviolet light.

12. The system of claim 11, wherein the plurality of light sources each produce light having wavelengths absorbed by a material of the object.

13. The system of claim 11, wherein the controller is adapted to control the motion stage to adjust the size of the light pattern from the image generator.

* * * * *